(12) United States Patent
Yajima

(10) Patent No.: US 8,679,579 B2
(45) Date of Patent: Mar. 25, 2014

(54) METHOD OF MANUFACTURING POLARIZING MEMBER

(75) Inventor: Eiichi Yajima, Shinjuku-ku (JP)

(73) Assignee: Hoya Corporation, Tokyo (JP)

(*) Notice: Subject to any disclaimer, the term of this patent is extended or adjusted under 35 U.S.C. 154(b) by 151 days.

(21) Appl. No.: 13/010,500

(22) Filed: Jan. 20, 2011

(65) Prior Publication Data

US 2011/0268874 A1    Nov. 3, 2011

(30) Foreign Application Priority Data

Jan. 21, 2010  (JP) .................................. 2010-010658
Jan. 21, 2010  (JP) .................................. 2010-010660
Jan. 21, 2010  (JP) .................................. 2010-010661

(51) Int. Cl.
  *B05D 5/06*   (2006.01)

(52) U.S. Cl.
  USPC ........................................................ 427/163.1

(58) Field of Classification Search
  USPC .............................................. 427/162, 163.1
  See application file for complete search history.

(56) References Cited

U.S. PATENT DOCUMENTS

2009/0053516 A1*  2/2009  Davidovits et al. ............ 428/339
2011/0262636 A1*  10/2011  Ohta et al. ..................... 427/162

FOREIGN PATENT DOCUMENTS

WO   WO 2009025272   *  2/2009
WO   WO 2009/156784  *  12/2009

* cited by examiner

*Primary Examiner* — Elizabeth Burkhart
(74) *Attorney, Agent, or Firm* — Sughrue Mion, PLLC

(57) ABSTRACT

An aspect of the present invention relates to a method of manufacturing a polarizing member comprising: forming a polarizing film by coating a dichroic dye-containing solution on a substrate; subjecting the polarizing film that has been formed to a treatment to immobilize the dichroic dye in the film; coating a waterborne resin composition containing a resin component and a water-based solvent on the polarizing film after the immobilization treatment, and drying the composition to form a primer layer; and forming a functional film on the primer layer that has been formed; wherein after the immobilization treatment but before the coating of the waterborne resin composition, an article to be coated is subjected to heat treatment.

4 Claims, 1 Drawing Sheet

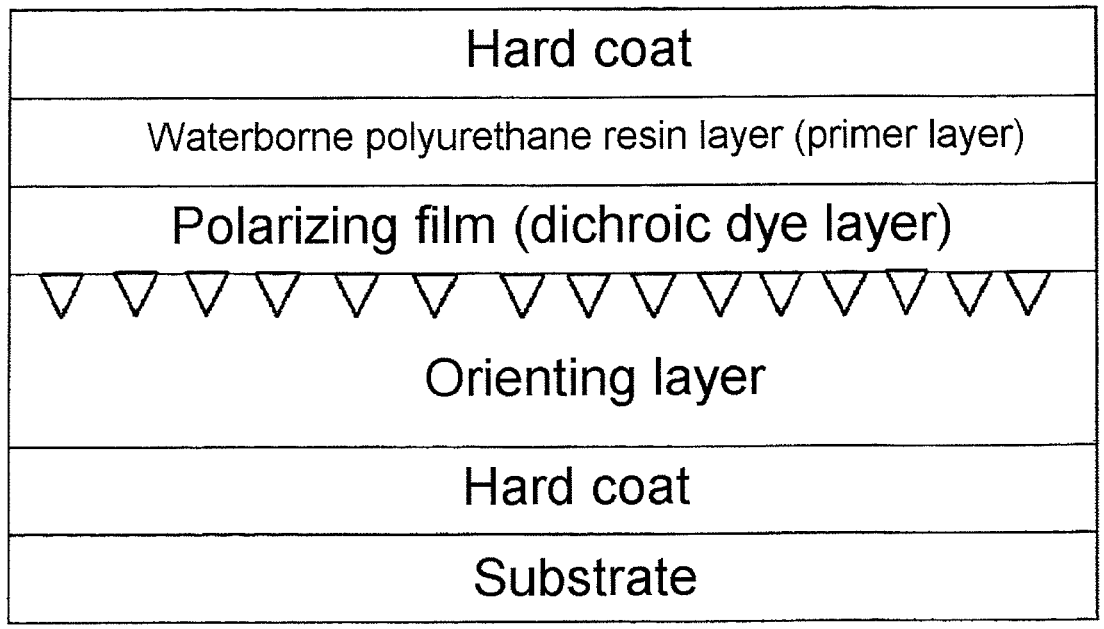

METHOD OF MANUFACTURING POLARIZING MEMBER

CROSS-REFERENCE TO RELATED APPLICATIONS

This application claims the benefit of priority under 35 USC 119 to Japanese Patent Application Nos. 2010-010658, 2010-010660 and 2010-010661, filed on Jan. 21, 2010, which are expressly incorporated herein by reference in their entirety.

BACKGROUND OF THE INVENTION

Field of the Invention

The present invention relates to a method of manufacturing a polarizing member, and particularly, to a method of manufacturing a polarizing member exhibiting good durability.

Polarizing lenses are used as anti-glare glasses in specific industries such as the welding and medical treatments, as well as in various sports such as skiing. Generally, the polarizing property of a dichroic dye is used to combat glare. The polarizing property of dichroic dyes is widely utilized in optical applications such as display devices, light-transmitting devices, and automobile and window glass. These polarizing members are normally fabricated by forming a polarizing film containing a dichroic dye on a substrate, or on an orienting layer provided on a substrate. Examples of methods of manufacturing such polarizing members are given in, for example, Document 1 (WO2006/081006) and family members US2006/146234A1, US2010/028532A1 and U.S. Pat. No. 7,625,626, Document 2 (Japanese Unexamined Patent Publication (KOKAI) No. 2009-237361) and family member EP2 259 101A1, Document 3 (WO2008/106034) and family members US2010/060984A1 and US2008/206577A1, and Document 4 (WO2009/029198) and family member US2009/053516A1, which are expressly incorporated herein by reference in their entirety.

SUMMARY OF THE INVENTION

As described in Documents 1 to 4, in polarizing members, a functional layer is normally provided on a polarizing film to enhance durability, impart various functions, and the like. However, when there is little adhesion between the polarizing film and the functional film, the functional film will sometimes separate from the member main body during storage or use.

An aspect of the present invention provides for a polarizing member having good durability with good adhesion between the polarizing film and a functional layer.

In recent years, there has been a trend toward limiting the use of organic solvents because of their effects on the environment and on the human body. As a result, waterborne resin compositions that contain almost no organic solvent have been proposed. Since many dichroic dyes are water-soluble, the present inventor thought that these waterborne resin compositions would be well suited to coating on polarizing films containing dichroic dyes. When he used a waterborne resin composition to form a primer layer positioned between a polarizing film and a functional layer, it became possible to enhance the initial adhesion between the polarizing film and the functional film.

However, investigation by the present inventor revealed that the primer layer was inadequate to maintain good adhesion between the polarizing film and the functional film over extended periods. Accordingly, the present inventor conducted extensive research into discovering a means of maintaining good adhesion over an extended period. As a result, he discovered that by conducting heat treatment on the article to be coated after immobilization treatment of the dichroic dye but before coating the waterborne resin composition, it was possible to maintain good adhesion between the polarizing film and the functional film over an extended period. In this regard, the present inventor presumed that the fact that the state of the surface of the polarizing film following immobilization treatment, on which the coating was to be applied, was modified by the heat treatment to make it readily bond with or adsorb functional groups present in the resin component contained in the waterborne resin composition contributed to the enhancement of long-term adhesion.

The present invention was devised on the basis of the above discovery.

An aspect of the present invention relates to:

[1] A method of manufacturing a polarizing member comprising:

forming a polarizing film by coating a dichroic dye-containing solution on a substrate;

subjecting the polarizing film that has been formed to a treatment to immobilize the dichroic dye in the film;

coating a waterborne resin composition containing a resin component and a water-based solvent on the polarizing film after the immobilization treatment, and drying the composition to form a primer layer; and forming a functional film on the primer layer that has been formed;

wherein after the immobilization treatment but before the coating of the waterborne resin composition, an article to be coated is subjected to heat treatment.

The above aspect may be the following embodiments:

[2] The method of manufacturing a polarizing member according to [1], wherein the immobilization treatment is conducted by coating a silane coupling agent solution on the polarizing film.

[3] The method of manufacturing a polarizing member according to [2], wherein an epoxy group-containing silane coupling agent is employed as the above silane coupling agent.

[4] The method of manufacturing a polarizing member according to [3], wherein the immobilization treatment is conducted by sequentially coating an amino group-containing silane coupling agent solution and an epoxy group-containing silane coupling agent solution on the polarizing film.

[5] The method of manufacturing a polarizing member according to any of [1] to [4], wherein the resin component comprises polyurethane resin.

[6] The method of manufacturing a polarizing member according to any of [1] to [5], wherein once the article to be coated has cooled following the heat treatment, the waterborne resin composition is coated.

[7] The method of manufacturing a polarizing member of any of [1] to [6], wherein the heat treatment is conducted by placing the article to be coated within a heating furnace with an atmospheric temperature within the furnace falling within a range of 40 to 80° C.

[8] The method of manufacturing a polarizing member according to any of [1] to [7], wherein an orienting layer is present between the substrate and the polarizing film.

[9] The method of manufacturing a polarizing member according to [8], wherein the orienting layer contains an oxide of silicon.

[10] The method of manufacturing a polarizing member according to any of [1] to [9], wherein the functional film is a hard coat film.

[11] The method of manufacturing a polarizing member according to any of [1] to [10], further comprising treating the dichroic dye in the polarizing film to render the dichroic dye insoluble in water.

As set forth above, the use of a waterborne resin composition to form a primer layer can enhance initial adhesion between the polarizing film and a functional layer, but is inadequate to maintain adhesion for an extended period. By contrast, applying the present invention makes it possible to maintain good adhesion for an extended period between the polarizing film and a functional film.

By the way, as the result of research by the present inventor, the generation of haze due to the generation of cracks in the polarizing film was confirmed in some polarizing members obtained by forming a primer layer using a waterborne resin composition between the polarizing film and a functional film as set forth above. The generation of haze in polarizing members, particularly polarizing lenses (eyeglass lenses), compromises optical characteristics. Accordingly, the present inventor conducted further extensive research into providing a polarizing member affording both good durability and optical characteristics, and to discover a means of preventing the generation of cracks in the polarizing film in a polarizing member having a primer layer formed of a waterborne resin composition. As a result, he discovered that the generation of cracks in the polarizing film could be inhibited by forming a thin primer layer with a thickness of equal to or less than 0.5 µm. The present inventors presume the reasons for this to be as follows.

Waterborne resins generally have the property of tending to absorb moisture, and thus tend to swell. Accordingly, a primer layer formed of a waterborne resin composition tends to deform (swell). As the primer layer deforms, the polarizing film also deforms. The thicker the primer layer becomes, the greater the amount of deformation. When the amount of deformation of the primer layer cannot be matched, cracks are generated in the polarizing film. Accordingly, it is thought that by keeping the thickness of the primer layer to within a range such that the polarizing film is able to withstand the deformation, that is, equal to or less than 0.5 µm, it is possible to inhibit the generation of cracks in the polarizing film.

That is, the present inventors discovered the following aspect (also referred to as "Aspect A" hereinafter). Aspect A makes it possible to provide a polarizing member having both good optical characteristics and durability. In particular, combining the manufacturing method of the present invention set forth above with Aspect A below makes it possible to provide a polarizing member having good optical characteristics and exhibiting good durability over an extended period.

[1] A polarizing member comprising a polarizing film containing a dichroic dye and a functional film in this order on a substrate, which comprises a waterborne resin layer having a thickness of equal to or less than 0.5 µm between the polarizing film and the functional film.

Aspect A above may be following embodiments:

[2] The polarizing member according to [1], which comprises an orienting layer between the substrate and the polarizing film.

[3] The polarizing member according to [2], wherein the orienting layer comprises an oxide of silicon.

[4] The polarizing member according to any of [1] to [3], wherein the waterborne resin layer comprises polyurethane resin as the resin component.

[5] The polarizing member according to any of [1] to [4], wherein the functional film is a hard coat film.

[6] A method of manufacturing a polarizing member comprising:
forming a polarizing film by coating a dichroic dye-containing solution on a substrate;
forming a primer layer on the polarizing film that has been formed; and
forming a functional film on the primer layer that has been formed,
characterized by forming a waterborne resin layer having a thickness of equal to or less than 0.5 µm as the above primer layer by coating a waterborne resin composition containing a resin component and a water-based solvent on the polarizing film, and drying the composition.

[7] The method of manufacturing a polarizing member according to [6], wherein polyurethane resin is employed as the resin component.

[8] The method of manufacturing a polarizing member according to [6] or [7], wherein the waterborne resin solution is a water dispersion in which the resin component is dispersed in water.

[9] The method of manufacturing a polarizing member according to any of [6] to [8], wherein an orienting layer is formed on the substrate, and, on the orienting layer, the polarizing film is formed.

[10] The method of manufacturing a polarizing member according to [9], wherein a layer comprising an oxide of silicon is formed as the orienting layer.

[11] The method of manufacturing a polarizing member according to any of [6] to [10], wherein a hard coat layer is formed as the functional film.

[12] The method of manufacturing a polarizing member according to any of [6] to [11], further comprising treating the dichroic dye in the polarizing film to render the dichroic dye insoluble in water prior to the formation of the primer layer.

[13] The method of manufacturing a polarizing member according to any of [6] to [12], further comprising a treatment of immobilizing the dichroic dye in the polarizing film prior to the formation of the primer layer.

The present inventor also made the following discoveries.

In Examples of above-cited Documents 1 and 3, acrylic coatings are employed as functional films over polarizing films. Although the acrylic coatings effectively increase the resistance to scratching of the polarizing members, they adhere poorly to polarizing films containing dichroic dyes, and thus sometimes separate from the member main body during storage or use. In this regard, the present inventor considered the fact that the polyfunctional acrylate compounds that are employed to form functional films have poor compatibility with the dichroic dyes that are contained in the polarizing films to be the cause of the low adhesion between the acrylic functional films and the polarizing films.

By contrast, when the present inventor formed a primer layer using a waterborne resin composition between a polarizing film and an acrylic functional film, it became possible to maintain good adhesion between the polarizing film and the functional film over an extended period. This was attributed by the present inventor to the fact that the waterborne resin composition had good compatibility with both the dichroic dye film (polarizing film) and the polyfunctional acrylate compound. As a result of research conducted by the present inventor, it became clear that waterborne resin compositions exhibited high compatibility with polarizing films even after treatment of the dichroic dyes to render them insoluble in water. This point was previously unknown, and was discovered for the first time ever by the present inventor.

That is, the present inventors also discovered the following aspect (also referred to as "Aspect B" hereinafter). Aspect B makes it possible to maintain good adhesion between an acrylic coating and a polarizing film over an extended period. In particular, by combining as desired two or more of the three aspects, the manufacturing method of the present invention and Aspect A, that were described above, and Aspect B below, it is possible to provide a polarizing member exhibiting good durability over an extended period and having good optical characteristics.

A polarizing member comprising a polarizing film containing a dichroic dye and a functional film in this order on a substrate, which comprises a waterborne resin layer between the polarizing film and the functional film, the functional film being formed by curing a coating film comprising a polyfunctional acrylate compound.

Aspect B above may be following embodiments:

[2] The polarizing member according to [1], wherein the polarizing film comprises a dichroic dye that has been treated to render insoluble in water.

[3] The polarizing member according to [1] or [2], which comprises an orienting layer between the substrate and the polarizing film.

[4] The polarizing member according to [3], wherein the orienting layer comprises an oxide of silicon.

[5] The polarizing member according to any of [1] to [4], wherein the waterborne resin layer comprises polyurethane resin as the resin component.

[6] A method of manufacturing a polarizing member comprising:

forming a polarizing film by coating a dichroic dye-containing solution on a substrate;

forming a primer layer on the polarizing film that has been formed; and forming a functional film on the primer layer that has been formed, characterized by forming the primer layer by coating a waterborne resin composition containing a resin component and a water-based solvent on the polarizing film, and drying the composition, as well as by forming the functional film by coating a coating liquid containing a polyfunctional acrylate compound on the primer layer that has been formed to form a coating film, and then curing the coating film.

[7] The method of manufacturing a polarizing member according to [6], wherein polyurethane resin is employed as the resin component.

[8] The method of manufacturing a polarizing member according to [5] or [7], wherein the waterborne resin solution is a water dispersion in which the resin component is dispersed in water.

[9] The method of manufacturing a polarizing member according to any of [6] to [8], wherein an orienting layer is formed on the substrate, and, on the orienting layer, the polarizing film is formed.

[10] The method of manufacturing a polarizing member according to [9], wherein a layer comprising an oxide of silicon is formed as the orienting layer.

[11] The method of manufacturing a polarizing member according to any of [6] to [10], further comprising treating the dichroic dye in the polarizing film to render the dichroic dye insoluble in water prior to the formation of the primer layer.

[12] The method of manufacturing a polarizing member according to any of [6] to [11], further comprising a treatment of immobilizing the dichroic dye in the polarizing film prior to the formation of the primer layer.

The present invention can provide a high-quality polarizing member exhibiting good durability over an extended period.

BRIEF DESCRIPTION OF THE DRAWINGS

FIG. 1 is a descriptive drawing of the layer structure of the polarizing lenses of Examples and Comparative Examples.

DETAILED DESCRIPTION OF THE EMBODIMENTS

An aspect of the present invention relates to a method of manufacturing a polarizing member comprising: forming a polarizing film by coating a dichroic dye-containing solution on a substrate; subjecting the polarizing film that has been formed to a treatment to immobilize the dichroic dye in the film; coating a waterborne resin composition containing a resin component and a water-based solvent on the polarizing film after the immobilization treatment, and drying the composition to form a primer layer; and forming a functional film on the primer layer that has been formed. The method of manufacturing a polarizing member of the present invention makes it possible to maintain good adhesion between the polarizing film and the functional film over an extended period by heat-treating an article to be coated after the immobilization treatment but before the coating of the waterborne resin composition.

The method of manufacturing a polarizing member of the present invention will be described in detail below.

Substrate

The above substrate is not specifically limited; examples are plastics and inorganic glasses. Examples of plastics are methyl methacrylate homopolymers; copolymers of methyl methacrylate and one or more other monomers; diethylene glycol bisallylcarbonate homopolymers; copolymers of diethylene glycol bisallylcarbonate and one or more other monomers; sulfur-containing copolymers; halogen copolymers; polycarbonate; polystyrene; polyvinyl chloride; unsaturated polyester; polyethylene terephthalate; polyurethane; polythiourethane; polymers made from materials including epithio group-containing compounds; homopolymers of sulfide bond-containing monomers; copolymers of a sulfide and one or more other monomers; copolymers of a polysulfide and one or more other monomers; and copolymers of a polydisulfide and one or more other monomers. The thickness of the substrate is not specifically limited. For example, when the polarizing member is a polarizing lens, the substrate is normally about 1 to 30 mm in thickness. The surface configuration of the substrate on which the polarizing layer is formed is not specifically limited. It can be of any shape, including planar, convex, and concave shapes.

Orienting Layer

The polarizing property of the dichroic dye contained in the polarizing film is achieved primarily by uniaxial orientation of the dichroic dye. To uniaxially orient the dichroic dye, the method of impregnating a polyvinyl alcohol (PVA) film with dichroic dye and then uniaxially extending the film, and the method of applying a coating liquid containing a dichroic dye on a grooved surface are generally employed. When forming the polarizing film by the latter method, that is, by applying a coating liquid on a grooved surface, the grooves for causing the dichroic dye to uniaxially orient itself can be formed on the surface of the substrate, or can be formed on the surface of an orienting layer provided on the substrate, such as described in Documents 1 to 4, which is advantageous from the perspective of realizing a good polarizing property in the dichroic dye.

The orienting layer is normally provided directly on, or indirectly through the other layer on the substrate. A hard coat layer is an example of a layer that can be formed between the substrate and the orienting layer. The hard coat layer is not specifically limited. A coating in which a microparticulate metal oxide is added to an organic silicon compound is suitable. Instead of an organic silicon compound, an acrylic compound can be employed. Further, a known UV-curable resin or EB-curable resin, such as an acrylate monomer or oligomer, can be employed as a coating composition for forming a hard coat. For the details of the hard coat layer, reference can be made to paragraphs [0071] to [0074] in Japanese Unexamined Patent Publication (KOKAI) No. 2007-77327 and paragraph [0027] in Japanese Unexamined Patent Publication (KOKAI) No. 2009-237361, for example. The thickness of the hard coat layer is, for example, about 0.5 to 10 μm. Lens substrates with hardcoats are commercially available; an orienting layer can be formed on such a lens substrate in the present invention.

The thickness of the orienting layer is normally about 0.02 to 5 μm, desirably about 0.05 to 0.5 μm. The orienting layer can be formed by depositing a film-forming material by a known film-forming method such as vapor deposition or sputtering, or formed by a known coating method such as dipping or spin coating. Examples of suitable film-forming materials are metals, metalloids, or oxides, complexes or compounds thereof. The use of a material selected from among Si, Al, Zr, Ti, Ge, Sn, In, Zn, Sb, Ta, Nb, V, Y, and Cr or oxides thereof, as well as complexes or compounds of these materials, is preferred. Of these, from the perspective of the ease of imparting functions to the orienting layer, oxides of silicon such as SiO and $SiO_2$ are desirable. Of these, from the perspective of reactivity with the silane coupling agent described further below, $SiO_2$ is preferred.

On the other hand, an example of the orienting layer that is formed by the above-described coating method is a sol-gel film containing an inorganic oxide sol. Examples of suitable coating liquids for forming the sol-gel film are coating liquids containing an inorganic oxide sol and at least one from among alkoxysilanes and hexaalkoxydisiloxanes. From the perspective of the ease of imparting functions to the orienting film, the above alkoxysilane is desirably the alkoxysilane denoted by general formula (1) in Japanese Unexamined Patent Publication (KOKAI) No. 2009-237361 and the above hexaalkoxydisiloxane is desirably the hexaalkoxydisiloxane denoted by general formula (2) in Japanese Unexamined Patent Publication (KOKAI) No. 2009-237361. The coating liquid can contain one of an alkoxysilane and a hexaalkoxydisiloxane, or both. Further, as needed, the functional group-containing alkoxysilane denoted by general formula (3) in Japanese Unexamined Patent Publication (KOKAI) No. 2009-237361 can be incorporated. For details regarding the coating liquid and film-forming method (coating method), reference can be made to paragraphs [0011] to [0023] and [0029] to [0031] of Japanese Unexamined Patent Publication (KOKAI) No. 2009-237361 and Examples described in the same publication.

Next, to uniaxially orient the dichroic dye in the coating liquid that is coated on the orienting layer, grooves are normally formed on the orienting layer that has been formed. When the dichroic dye-containing coating liquid is coated on the surface of an orienting layer in which grooves have been formed, the dichroic dye orients itself either along the grooves or perpendicular to them. Thus, the dichroic dye is uniaxially oriented, permitting development of its good polarizing property. For example, the grooves can be formed by the rubbing step that is conducted to orient liquid crystal molecules. A rubbing step is a step in which a surface being polished is rubbed in a single direction with fabric or the like. For the details thereof, reference can be made to U.S. Pat. Nos. 2,400,877 and 4,865,668, which are expressly incorporated herein by reference in their entirety, for example. Grooves can also be formed on the orienting layer by the polishing treatment described in paragraphs [0033] and [0034] in Japanese Unexamined Patent Publication (KOKAI) No. 2009-237361. It suffices to set the depth and pitch of the grooves that are formed in a manner permitting uniaxial orientation of the dichroic dye.

Polarizing Layer (Dichroic Dye Layer)

Next, the polarizing layer (dichroic dye layer) provided directly on, or through the orienting layer and the like on the substrate will be described.

The term "dichroic" refers to the property whereby the color of transmitted light varies with the direction of propagation due to anisotropy of selective absorption of light by a medium. A dichroic dye has the property of strong absorption of polarized light in a specific orientation of the dye molecules and weak absorption in a direction orthogonal thereto. Some dichroic dyes are known to exhibit liquid crystal states at certain concentrations and in certain temperature ranges when water is employed as a solvent. Such liquid crystal states are called as lyotropic liquid crystals. Stronger dichroism can be achieved by using the liquid-crystal states of dichroic dyes to orient the dye molecules in a specific direction. Coating a coating liquid containing a dichroic dye on an orienting layer in which grooves have been formed makes it possible to uniaxially orient the dichroic dye, permitting the formation of a polarizing layer with good polarizing property.

The dichroic dye employed in the present invention is not specifically limited. Examples are various dichroic dyes that are commonly employed in polarizing members. Specific examples are azo dyes, anthraquinone dyes, merocyanine dyes, styryl dyes, azomethine dyes, quinone dyes, quinophthalone dyes, perylene dyes, indigo dyes, tetrazine dyes, stilbene dyes, and benzidine dyes. The dyes described in U.S. Pat. No. 2,400,877, Published Japanese Translation (TOKUHYO) No. 2002-527786 of a PCT International Application, which are expressly incorporated herein by reference in their entirety, and the like may also be employed.

The dichroic dye-containing coating liquid can be a solution or a suspension. Many dichroic dyes are water soluble. Thus, the coating liquid is normally an aqueous solution with water as solvent. The content of dichroic dye in the coating liquid can be, for example, about 1 to 50 mass percent, but is not limited to this range so long as the desired polarizing property is achieved.

The coating liquid can contain other components in addition to the dichroic dye. An example of another component is a dye other than a dichroic dye. Compounding such dyes makes it possible to manufacture a polarizing member of desired color. From the perspective of further enhancing coating properties and the like, additives such as rheology-modifying agents, adhesion-enhancing agents, plasticizers, and leveling agents can be compounded.

The method of coating the coating liquid is not specifically limited; examples are the above known methods such as dipping and spin coating. The thickness of the polarizing film is not specifically limited, but is normally about 0.05 to 5 μm. The silane coupling agent described further below is normally used to impregnate the polarizing film and is substantially contained in the polarizing film.

When employing a water-soluble dye as the dichroic dye, a water-insolubilizing treatment is desirably conducted after coating and drying the coating liquid to enhance the stability of the film. The water-insolubilizing treatment can be conducted by, for example, ion exchanging the terminal hydroxyl group of the dye molecule or by creating a state of chelation between the dye and a metal ion. To this end, the method of immersing the polarizing film that has been formed in a metal salt aqueous solution is desirably employed. The metal salt that is employed is not specifically limited; examples are $AlCl_3$, $BaCl_2$, $CdCl_2$, $ZnCl_2$, $FeCl_2$, and $SnCl_3$. After the water-insolubilizing treatment, the surface of the polarizing film can be dried again.

The polarizing film is subjected to a treatment to immobilize the dichroic dye for enhancing a film strength and stability. This immobilization treatment is desirably conducted after the above water-insolubilizing treatment. The immobilization treatment can immobilize the orientation state of the dichroic dye within the polarizing film.

The immobilization treatment is desirably conducted by coating a solution of a silane coupling agent at a concentration of, for example, about 1 to 15 mass percent, desirably about 1 to 10 mass percent, on the surface of the polarizing film. The solvent in the solution is desirably a water-based solvent, preferably water or a mixed solvent of water and alcohol (methanol, ethanol, or the like). The solution can be coated by a known means such as dipping, spin coating, or spraying. The immobilizing effect can be further heightened by placing the member comprising the lens substrate and the polarizing film for a prescribed period in a heating furnace or the like in the course of the immobilization treatment. The atmospheric temperature and residence time within the furnace can be determined based on the type of silane coupling agent, and are usually ambient temperature to 120° C. and roughly 5 minutes to 3 hours, respectively.

As the silane coupling agent, epoxy group-containing silane coupling agents and amino group-containing silane coupling agents are desirable. From the perspective of the immobilization effect, the immobilization treatment is preferably conducted by coating at least an epoxy group-containing silane coupling agent solution on the polarizing film, and further preferably by coating an epoxy group-containing silane coupling agent solution after the coating of an amino group-containing silane coupling agent solution. This is because amino group-containing silane coupling agents (also referred to as "aminosilanes", hereinafter) are presumed, due to their molecular structures, to be able to more readily enter between the molecules of the dichroic dye that has been uniaxially oriented by the orienting layer than epoxy group-containing silane coupling agents (also referred to as "epoxysilanes", hereinafter).

This point will be further described. The mechanism by which dichroic dyes are immobilized in an oriented state by silane coupling agents is presumed to be as follows. When a silane coupling agent enters between the molecules of a dichroic dye that has been uniaxially oriented, the silane coupling agent bonds to the lower layer of the polarizing film (for example, orienting layer) by means of silanol groups that are generated by hydrolysis. As a result, the silane coupling agent is immobilized between the molecules of the dichroic dye, making it difficult for the dichroic dye molecules to associate between themselves and maintaining the oriented state of the dichroic dye. When an aminosilane is employed as the coupling agent for bonding to the lower layer, the amino group is presumed to be immobilized in the polarizing film with the amino group facing upward. As for the reason, the present inventor presumes as follows. When an epoxysilane is coated thereover, the epoxysilane plays the role of a crosslinking agent, increasing the coating strength. Since epoxy groups are highly reactive with amino groups, the epoxy groups form bonds with the amino groups and silanol groups generated by hydrolysis in the epoxysilane condense, forming siloxane bonds.

The silane coupling agent generally has a structure denoted by $R\text{—}Si(OR')_3$ (wherein the multiple instances of R' may be identical or different). The term "epoxy group-containing silane coupling agent" refers to a silane coupling agent that contains an epoxy group as the functional group denoted by R. The epoxy group is normally bonded to the Si through a divalent linking group. Examples of divalent linking groups are the linking groups contained in the specific example compounds set forth further below. Additionally, the functional group denoted by R' is normally an alkyl group that is hydrolyzed in the aqueous solvent, producing silanol (Si—OH). The alkyl group denoted by R' comprises for example 1 to 10, desirably 1 to 3, carbon atoms. On the other hand, the aminosilane comprises an amino group in the functional group denoted by R. The details of the above structural formula relating to aminosilanes are as set forth for the epoxy group-containing silane coupling agent with the exception that an amino group is contained in R.

Specific examples thereof are: γ-glycidoxypropyltrimethoxysilane (γ-GPS), γ-glycidoxypropylmethyldiethoxysilane, and other glycidoxy group-containing trialkoxysilanes; and β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, γ-(3,4-epoxycyclohexyl)propyltrimethoxysilane, γ-(3,4-epoxy-cyclohexyl)propyltriethoxysilane, δ-(3,4-epoxycyclohexyl)butyltrimethoxysilane, δ-(3,4-epoxycyclohexyl)butyltriethoxysilane, and other epoxyalkylalkoxysilanes; and amino group-containing alkoxysilanes such as N-(β-aminoethyl)-γ-aminopropyltrimethoxysilane, N-(β-aminoethyl)-γ-aminopropylmethylmethoxysilane, γ-aminopropylmethyldimethoxysilane, γ-aminopropylmethyldiethoxysilane, γ-aminopropyltrimethoxysilane, γ-aminopropyltriethoxysilane, N-(β-aminoethyl)-γ-aminopropylmethyldimethoxysilane, and N-(β-aminoethyl)-γ-aminopropylmethyldiethoxysilane. One of these silane coupling agents can be employed alone, or two or more of these silane coupling agents can be employed in combination. After coating the silane coupling agent, the coating surface can be rinsed with pure water, deionized water, or the like to remove the excess silane coupling agent that has adhered to the outermost surface.

Primer Layer

In the method of manufacturing a polarizing member of the present invention, the primer layer that is positioned between the polarizing film after the immobilization treatment and the functional film is a waterborne resin layer, formed of a waterborne resin composition containing a resin component and a water-based solvent, that can contribute to enhancing adhesion between the upper layer, functional film, and the polarizing film. Since it is water-based, it is more advantageous than a non-waterborne resin from the perspective of compatibility with the dichroic dye contained in the lower layer, polarizing film. In the present invention, the term "waterborne resin composition" means a composition having the property of solidifying when the water-based solvent contained therein is removed.

The thickness of the primary layer that is formed here is desirably equal to or less than 0.5 μm to simultaneously achieve enhanced adhesion between the polarizing film and the functional film and prevent cracking of the polarizing film. From the perspective of maintaining adhesion between the polarizing film and the functional film, the thickness of the primer layer is desirably equal to or greater than 0.05 µm. From the perspectives of achieving both optical characteristics and adhesion in the polarizing member obtained, the thickness of the primer layer preferably falls within a range of 0.10 and 0.45 µm.

The water-based solvent that is contained in the waterborne resin composition is, for example, a mixed solvent of water and a polar solvent, desirably water. From the perspectives of solution stability and film-forming properties, the concentration of the solid component in the waterborne resin composition is desirably 1 to 62 mass percent, preferably 5 to 38 mass percent. The waterborne resin composition may comprise, as needed, in addition to the resin component, additives such as oxidation inhibitors, dispersing agents, and plasticizers. Commercially available waterborne resin compositions can be diluted with solvents such as water, alcohol, and propylene glycol monomethyl ether (PGM) for use.

The waterborne resin composition can contain the resin component dissolved or dispersed in the form of microparticles (desirably colloidal particles) in a water-based solvent. Among these, a dispersion in which the resin component is dispersed in the form of microparticles in a water-based solvent (desirably water) is desirable. In that case, the particle diameter of the resin component is desirably equal to or less than 0.3 µm from the perspective of the dispersion stability of the composition. Further, the pH of the waterborne resin composition at 25° C. is desirably about 5.5 to 9.0 from the perspective of stability. The viscosity at 25° C. is desirably 5 to 500 mPa·s, and preferably 10 to 50 mPa·s, from the perspective of suitability to coating. Taking into account the physical properties of the waterborne resin layer that is formed, a waterborne resin composition with the following film characteristics is desirable. The coating film that is obtained by coating to a thickness of 1 mm on a glass sheet and drying for one hour at 120° C. desirably has a glass transition temperature Tg of −58° C. to 7° C., a pencil hardness of 4B to 2H, and a tensile strength as measured according to JIS K 7113 of 15 to 69 MPa.

Examples of the resin component in the waterborne resin composition are polyurethane resins, acrylic resins, and epoxy resins. From the perspective of adhesion, polyurethane resin is desirable as the resin component. Waterborne resin compositions containing polyurethane resin, that is, waterborne polyurethane resin compositions, can be prepared by, for example, subjecting a high-molecular-weight polyol compound and an organic polyisocyanate compound to a urethane reaction in a solvent with high compatibility with water that is inert to the reaction in the presence of a chain-extending agent as needed to obtain a prepolymer; neutralizing the prepolymer; and then dispersing the product in a water-based solvent containing a chain-extending agent to increase the molecular weight. For such waterborne polyurethane resin compositions and methods of preparing, reference can be made, for example, to paragraphs [0009] to of Japanese Patent No. 3,588,375; paragraphs [0012] to [0021] of Japanese Unexamined Patent Publication (KOKAI) Heisei No. 8-34897; paragraphs [0010] to of Japanese Unexamined Patent Publication (KOKAI) Heisei No. 11-92653; and paragraphs [0010] to [0033] of Japanese Unexamined Patent Publication (KOKAI) Heisei No. 11-92655. The contents of the above applications are expressly incorporated herein by reference in their entirety. Commercially available aqueous urethane can be used as is, or diluted with a water-based solvent for use, as the waterborne polyurethane resin composition. Examples of commercially available aqueous polyurethanes that are suitable for use are the "Adeka Bontiter" series made by Asahi Denka Kogyo, K.K.; the "Olester" series made by Mitsui-Toatsu Chemicals, Inc.; the "Bondick" and "Hydran" series made by Dainippon Ink and Chemicals Corporation; the "Impranil" series made by Bayer; the "Sofranate" series made by Japan Sofran; the "Poise" series made by Kao; the "Sanprene" series made by Sanyo Chemical Industries, Ltd.; the "Izelax" series made by Hodogaya Chemical Co., Ltd.; the "Superflex" series made by Daiichi Yakuhin Kougyou Co., Ltd.; and the "Neo Rez" series made by Zeneca.

The waterborne polyurethane resin composition is desirably one that has been obtained by dispersing in a water-based solvent a terminal isocyanate prepolymer having the basic skeleton of a polyol such as a polyester polyol or a polyether polyol with anionic groups such as carboxyl groups or sulfone groups.

A primer layer in the form of a waterborne resin layer can be formed on the polarizing film by coating and drying the waterborne resin composition on the surface of the polarizing film after it has been subjected to the immobilization treatment. A known coating method such as dipping or spin coating can be employed. The coating conditions can be suitably selected to permit formation of a primer layer of desired thickness. Prior to coating, the surface of the polarizing film on which the coating is to be applied can be chemically treated with an acid, an alkali, various organic solvents, or the like; physically processed with plasma, ultraviolet radiation, ozone, or the like; or washed with various detergents. Conducting such a pretreatment can enhance adhesion of the polarizing film surface and the waterborne resin layer.

However, as set forth above, the present inventor discovered that it was necessary to conduct heat treatment (annealing) of an article to be coated in the form of the laminate of the substrate and the polarizing film before applying the coating to maintain good adhesion for an extended period. Accordingly, in the present invention, the article to be coated is subjected to heat treatment after the immobilization treatment but before coating the waterborne resin composition. The above heat treatment can be conducted, for example, by placing the entire member prior to coating in a heating furnace in which the temperature has been regulated to about 40 to 80° C., desirably for about 5 minutes to 1 hour. By cooling the member following the heat treatment, it is possible to stabilize the film thickness during coating of the primer liquid. This cooling treatment can be conducted by removing the member from the furnace after the heat treatment and letting it stand for a prescribed period so that it returns to temperature.

Following coating the waterborne resin composition, the composition can be dried to form a waterborne resin layer as the primer layer. The above drying can be conducted, for example, by placing the member on which the primer layer has been formed for 5 minutes to 24 hours in an atmosphere at from ambient temperature to 100° C.

Functional Film

Next, a functional film is formed over the primer layer that has been formed. Examples of functional layers are hard coat films and antireflective films. The functional film that is formed may be comprised of a single layer or two or more layers. However, from the perspectives of protecting the polarizing film and enhancing its durability, the functional film desirably comprises at least one layer in the form of a hard coat film.

The hard coat film has been described to some extent above. Forming the hardcoat layer that is present on the polarizing film of a photocuring compound is advantageous from the perspectives of operating properties and the optical characteristics of the polarizing member obtained.

Based on the above, a hard coat film that is comprised primarily of a multifunctional acrylate compound is a desirable example. In the present invention, the term "acrylate" includes the methacrylate. Below, the term "(meth)acrylate" includes both the acrylate and the methacrylate. The fact that, while an acrylic functional film adheres poorly to the polarizing film, it is possible to increase adhesion by providing a water-based resin layer (primer layer) that is formed of a waterborne resin composition between the two films was discovered by the present inventor. Aspect B set forth above was devised based on this knowledge.

The multifunctional acrylate compound that is employed to form the functional film is a compound having at least two acrylate-polymerizable groups within the molecule, and is desirably a compound having at least two acryloyloxy groups or methacryloyloxy groups within the molecule. Specific examples are ethylene glycol diacrylate, diethylene glycol diacrylate, 1,6-hexanediol diacrylate, neopentyl glycol diacrylate, trimethylolpropane triacrylate, trimethylolethane triacrylate, tetramethylolmethane triacrylate, tetramethylolmethane tetraacrylate, pentaglycerol triacrylate, pentaerythritol triacrylate, pentaerythritol tetraacrylate, glycerin triacrylate, dipentaerythritol triacrylate, dipentaerythritol tetraacrylate, dipentaerythritol pentaacrylate, dipentaerythritol hexaacrylate, tris(acryloyloxyethyl)isocyanurate, ethylene glycol dimethacrylate, diethylene glycol dimethacrylate, 1,6-hexanediol dimethacrylate, neopentyl glycol dimethacrylate, trimethylolpropane trimethacrylate, trimethylolethane trimethacrylate, tetramethylolmethane trimethacrylate, tetramethylolmethane tetramethacrylate, pentaglycerol trimethacrylate, pentaerythritol trimethacrylate, pentaerythritol tetramethacrylate, glycerin trimethacrylate, dipentaerythritol trimethacrylate, dipentaerythritol tetramethacrylate, dipentaerythritol pentamethacrylate, dipentaerythritol hexamethacrylate, tris(methacryloyloxyethyl)isocyanurate, phosphazene-based acrylate compounds and phosphazene-based methacrylate compounds in which an acryloyloxy group or methacryloyloxy group has been incorporated onto the phosphazene ring of a phosphazene compound, urethane acrylate compounds and urethane methacrylate compounds obtained by reacting a polyisocyanate having at least two isocyanate groups in the molecule with a polyol compound having at least one acryloyloxy group or methacryloyloxy group and a hydroxyl group, polyester acrylate compounds and polyester methacrylate compounds obtained by the reaction with a polyol compound having at least two carboxylic acid halides as well as at least one acryloyloxy group or methacryloyloxy group and a hydroxyl group in the molecule, and oligomers such as dimers, trimers, and the like of the various compounds listed above.

These compounds may be employed singly, or mixed in combinations of two or more for use. In addition to the above multifunctional (meth)acrylate, equal to or less than 10.0 mass percent, based on the solid component when the hard coat layer-use coating composition has been cured, of at least one monofunctional (meth)acrylate selected from the group consisting of hydroxyethyl(meth)acrylate, 2-hydroxyethyl (meth)acrylate, 2-hydroxypropyl(meth)acrylate, hydroxybutyl(meth)acrylate, 2-hydroxy-3-phenoxypropyl(meth)acrylate, and glycidyl(meth)acrylate, can be formulated.

Polymerizable oligomers can be added to the hard coat layer to adjust the hardness. Examples of such oligomers are terminal (meth)acrylate polymethyl methacrylate, terminal styryl poly(meth)acrylates, terminal (meth)acrylate polystyrenes, terminal (meth)acrylate polyethylene glycol, terminal (meth)acrylate acrylonitrile-styrene copolymers, terminal (meth)acrylate styrene-methyl(meth)acrylate copolymers, and other macromonomers. The content thereof is desirably 5.0 to 50.0 mass percent relative to the solid component of the coating composition when cured.

The above polymerizable components can be employed in the form of a mixed solution with a solvent. Commercially available polymerizable components can also be employed. Specific examples of commercially available compounds are "NK Hard M101" (a urethane acrylate compound made by Shin-Nakamura Chemical Co., Ltd.), "NK ester A-TMM-3L" (a tetramethylolmethane triacrylate made by Shin-Nakamura Chemical Co., Ltd.), "NK ester A-9530" (a dipentaerythritol hexaacrylate made by Shin-Nakamura Chemical Co., Ltd.), the "KAYARAD (registered trademark) DPHA series" (dipentaerythritol hexaacrylate compounds made by Nippon Kayaku Co., Ltd.), the "KAYARAD (registered trademark) DPCA series" (derivatives of dipentaerythritol hexaacrylate compounds made by Nippon Kayaku Co., Ltd.), "Aronix (registered trademark) M-8560" (a polyester acrylate compound made by Toagosei Co. Ltd.), "New Frontier (registered trademark) TEICA" (tris(acryloyloxyethyl)isocyanurate made by Daiichi Yakuhin Kougyou Co., Ltd.), and "PPZ" (a phosphazene-based methacrylate compound made by Kyoeisha Chemical Co., Ltd.). The coating composition for forming the hardcoat layer can also contain known photopolymerization initiators. The type and quantity of photopolymerization initiator employed is not specifically limited and can be suitably established.

The above hard coat layer-forming components are normally diluted with a solvent for use. Examples of solvents that can be suitably selected for use are hexane, octane, and other aliphatic hydrocarbons; toluene, xylene, and other aromatic hydrocarbons; ethanol, 1-propanol, isopropanol, 1-butanol, and other alcohols; methyl ethyl ketone, methyl isobutyl ketone, and other ketones; ethyl acetate, butyl acetate, and other esters; and cellosolve. Some of these organic solvents may be mixed for use as needed. The type and quantity of solvent employed are suitably selected based on the types and quantities of hard coat layer-forming components employed; the coating method; the thickness of the targeted hard coat; and the like.

The coating composition for forming the hard coat layer can be coated on the primer layer and irradiated with light after drying as needed to form the hard coat layer. The coating can be applied by a known coating method such as dipping or spin coating. The coating conditions can be suitably set to form a hard coat layer of desired thickness. The light that is irradiated can be an electron beam or ultraviolet radiation, for example. The type of light and the irradiation conditions of the light that is irradiated are suitably selected based on the types of components used to form the hard coat layer.

Additionally, when forming an antireflective film as a functional film, an antireflective film in the form of a single layer or multilayer film comprised of known inorganic oxides can be employed. Examples of the inorganic oxides are silicon dioxide ($SiO_2$), zirconium oxide ($ZrO_2$), aluminum oxide ($Al_2O_3$), niobium oxide ($Nb_2O_5$), and yttrium oxide ($Y_2O_3$). The method used to form the film is not specifically limited. The thickness of the hard coat that is formed on the polarizing film is, for example, 0.5 to 10 µm. The thickness of the antireflective film is, for example, 0.1 to 5 µm. Water-repellent films, UV-absorbing films, IR-absorbing films, photochromic films, antistatic films, and the like can be laminated as functional films.

The polarizing member obtained by the manufacturing method of the present invention as set forth above can exhibit good durability for an extended period. Thus, it is suited to various polarizing members employed by users over extended periods, such as polarizing lenses, particularly eyeglass lenses. However, the polarizing member obtained by the present invention is not specifically limited to the form of a lens so long as it has the structure set forth above. For example, the polarizing member of the present invention can be applied to polarizing members such as liquid-crystal displays, optical transmitters, and window glass in automobiles and buildings.

1. Examples and Comparative Examples of the Fabrication of a Polarizing Lens

Example 1

Fabrication of a Polarizing Lens (1) Forming the Orienting Layer

A Phoenix lens (refractive index 1.53, with hardcoat, 70 mm in diameter, base curve 4, center thickness 1.5 mm, made by HOYA Corporation) was employed as the lens substrate. A $SiO_2$ film was formed to a thickness of 0.2 μm by vacuum vapor deposition on the concave surface of the lens.

Abrasive-containing urethane foam (abrasive: $Al_2O_3$ particles with an average particle diameter of 0.8 μm, product name POLIPLA 203A, made by Fujimi Inc.; urethane foam: approximately the same shape as the curvature of the concave surface of the above lens) was employed to subject the $SiO_2$ film that had been formed to uniaxial polishing under conditions of a rotational speed of 350 rpm at a polishing pressure of 50 g/cm$^2$ for 30 seconds. The polished lens was rinsed in pure water and dried.

(2) Forming the Polarizing Film

After drying the lens, 2 to 3 g of an aqueous solution of roughly 5 mass percent of water-soluble dichroic dye (trade name Varilight solution 2S, made by Sterling Optics, Inc.) was spin coated on the polished surface to form a polarizing film. In the spin coating, the aqueous solution of dye was fed at a rotational speed of 300 rpm, which was held for 8 seconds, after which a rotational speed of 400 rpm was held for 45 seconds, followed by 1,000 rpm held for 12 seconds.

Next, an aqueous solution with an iron chloride concentration of 0.15 M, a calcium hydroxide concentration of 0.2 M, and a pH of 3.5 was prepared. The lens obtained above was immersed for about 30 seconds in this aqueous solution, withdrawn, and thoroughly rinsed in pure water. This step rendered the originally water-soluble dye insoluble (water insolubilization treatment).

(3) Immobilization Treatment

Following (2) above, the lens was immersed for 15 minutes in a 10 mass percent aqueous solution of γ-aminopropyl triethoxysilane. It was then rinsed three times with pure water, heat treated for 30 minutes in a heating furnace (temperature within furnace: 85° C.), removed from the furnace, and cooled to ambient temperature.

After cooling, the lens was immersed for 30 minutes in a 2 mass percent aqueous solution of γ-glycidoxypropyl trimethoxysilane.

(4) Heating and Cooling Treatments Following Immobilization Treatment

Following the immobilization treatment, the lens was heat treated for 30 minutes in a heating furnace (temperature within furnace: 60° C.), removed from the furnace, and cooled to ambient temperature.

Following the above processing, the thickness of the polarizing film that was formed was about 1 μm.

(5) Forming the Waterborne Resin Layer (Primer Layer)

The waterborne polyurethane resin composition was applied by spin coating to the surface of the polarizing film after the cooling treatment. The waterborne polyurethane resin composition employed consisted of trade name Adeka Bontiter HUX-232 made by ADEKA Corporation (a water dispersion obtained by dispersing in water a terminal isocyanate prepolymer containing a carboxyl group and having a polyester polyol as the basic skeleton; solid component: 30 mass percent; particle diameter of resin component: less than 0.1 μm; viscosity at 25° C.: 20 mPa·s; pH at 25° C.: 8.5) that had been diluted six-fold in PGM. In the spin coating, the composition was fed onto the polarizing film at a rotational speed of 100 rpm, which was held for 10 seconds; followed by a rotational speed of 400 rpm held for 10 seconds; and then 1,000 rpm held for 30 seconds.

Following the spin coating, the lens was dried by being heat treated for 30 minutes in a heating furnace (temperature within furnace: 60° C.), thereby forming a primer layer (waterborne resin layer) on the polarizing film. The thickness of the primer layer that was formed was 0.30 μm.

The film characteristics of the waterborne polyurethane resin composition employed, measured by the methods set forth above, were as follows: glass transition temperature Tg: −18° C.; pencil hardness H, tensile strength 49 MPa.

(6) Forming the Hard Coat Layer

A coating liquid obtained by mixing 1,000 mass parts of dipentaerythritol hexaacrylate (KAYARAD DPHA, made by Nippon Kayaku Co., Ltd.), 3,000 mass parts of ethyl acetate; and 30 mass parts of photopolymerization initiator (Irgacure 819 made by Ciba Japan) was applied by spin coating (1,000 rpm held for 30 seconds) to the lens that had been processed in (5) above. Following the coating, curing was conducted by irradiation with 1,200 mJ/cm$^2$ of UV using an ultraviolet irradiation device. This yielded a hardcoat 4.5 μm in thickness.

A total of three polarizing lenses having the layer structure shown in FIG. 1 were obtained by these steps.

Example 2

With the exception that a primer layer (waterborne resin layer) 0.44 μm in thickness was formed with a different quantity of waterborne polyurethane resin composition, polarizing lenses were obtained by the same method as in Example 1.

Example 3

With the exception that the waterborne polyurethane resin composition was applied immediately, without allowing the lens that had been removed from the heating furnace to cool following the heat treatment, polarizing lenses were obtained by the same method as in Example 1.

Comparative Example 1

With the exception that the primer layer was immediately formed without subjecting the lens to a heating and cooling treatment after the immobilization treatment, polarizing lenses were obtained by the same method as in Example 1.

Evaluation Methods (1) Evaluation of Initial Adhesion

The adhesion of the lens immediately following fabrication was evaluated by the following method.

<Adhesion Evaluation Method>
Crosscuts were made at intervals of 1.5 mm in the hard coat film to form a grid comprised of 100 squares. Adhesive tape (cellophane tape made by Nichiban K.K.) was strongly adhered to the spots where the crosscuts had been made, after which the adhesive tape was rapidly pulled away. Then, the number of squares separated among the 100 squares of cured film was counted. The evaluation scale was as follows:
(Evaluation Scale)
○ Number of squares that separated: 0 to 2/100
Δ Number of squares that separated: 3 to 5/100
X Number of squares that separated: 6 or fewer
(2) Adhesion after Warm Water Resistance Test
The various polarizing lenses of Examples and Comparative Example were immersed for 24 hours in 50° C. warm water and air dried. The adhesion of the polarizing lenses was then evaluated by the above method.
(3) Adhesion after Humidity Resistance Test
The various polarizing lenses of Examples and Comparative Example were stored for 168 hours in an environment with a temperature of 40° C. and a humidity of 90 percent RH. The adhesion of the polarizing lenses was then evaluated by the above method.
The results of the above are given in Table 1.

TABLE 1

|  | After immobilization treatment | | Adhesion immediately after fabrication | Adhesion after warm water resistance test | Adhesion after humidity resistance test |
| --- | --- | --- | --- | --- | --- |
|  | Presence or absence of heat treatment | Presence or absence of cooling treatment after heat treatment |  |  |  |
| Ex. 1 | Conducted | Conducted | ○ | ○ | ○ |
| Ex. 2 | Conducted | Conducted | ○ | ○ | ○ |
| Ex. 3 | Conducted | None | ○ | ○ | ○ |
| Comp. Ex. 1 | None | None | ○ | x | x |

As indicated in Table 1, the polarizing lenses of Comparative Example 1, in which no heat treatment was conducted after the immobilization treatment, exhibited low adhesion between the hard coat film and the polarizing film after both the warm water resistance test and the humidity resistance test. By contrast, the polarizing lenses of Examples 1 to 3 were all evaluated as having high adhesion. The various polarizing lenses of these Examples all exhibited haze values of ≦1.0 percent when measured with a Hazemeter HM-150 made by Murakami Color Research Laboratory immediately following fabrication, after the warm water resistance test, and after the humidity resistance test. A high degree of transparency was thus confirmed. Further, in observation of the cross-sections of the polarizing lenses of Examples 1 to 3 by a scanning electron microscope (SEM) (applied voltage: 10 kV; magnification: 5,000×), the primer layers of Examples 1 and 2 exhibited a higher degree of film thickness uniformity than that of Example 3. This was attributed to the cooling treatment following the heat treatment playing a role in stabilizing the film thickness.

Comparative Example 2

With the exceptions that non-waterborne urethane acrylate primer (UV-1700B from Daicel-Cytec Co. Ltd.) was diluted 100-fold with PGM and coated on the polarizing film by spin coating and then irradiated with UV radiation (cured) to form a primer layer 0.30 μm in thickness, polarizing lenses were obtained by the same method as in Example 1. Evaluation of the adhesion of the polarizing lenses by the above method immediately following fabrication yielded results of "X". Based on these results, the non-waterborne primer was evaluated as not readily permitting the formation of a primer layer exhibiting adequate effect for improving adhesion.

Comparative Example 3

With the exception that the coating liquid for forming the hard coat layer was applied directly on the polarizing film without forming a primer layer of waterborne polyurethane resin composition, polarizing lenses were obtained by the same method as in Example 1. The (1) initial adhesion, (2) adhesion after the warm water resistance test, and (3) adhesion after the humidity resistance test of the polarizing lenses obtained were measured by the same methods as those set forth above. The results are given along with the evaluation results of Examples 1 and 2 in Table 2 below.

TABLE 2

|  | Adhesion immediately after fabrication | Adhesion after warm water resistance test | Adhesion after humidity resistance test |
| --- | --- | --- | --- |
| Ex. 1 | ○ | ○ | ○ |
| Ex. 2 | ○ | ○ | ○ |
| Comp. Ex. 3 | x | x | x |

As shown in Table 2, the polarizing lenses of Comparative Example 3, on which no primer layer (waterborne polyurethane resin layer) was formed, exhibited low adhesion between the hard coat film and the polarizing film immediately following fabrication, after the warm water resistance test, and after the humidity resistance test. By contrast, the polarizing lenses of Examples 1 and 2 exhibited good adhesion in all evaluations.

2. Evaluation of Wettability (Measurement of the Contact Angle)

The contact angle relative to the surface of the polarizing film was measured by the method set forth below for the waterborne polyurethane resin composition and the coating liquid for forming the hard coat layer employed in Examples 1 and 2.
A contact-angle meter (Contact-angle meter Model No. CA-D) made by Kyowa Interface Science was used to measure the contact angles of the above composition and coating liquid relative to the surface of the polarizing film in lenses that had been processed up to the above-described cooling treatment. Each contact angle was measured three times and the average was calculated.

By the same method, the average value of the contact angle of the coating liquid for forming the hard coat layer relative to the primer layer surface formed by the same method as in Example 1 was calculated.

The wettability was evaluated using the scale given below based on the average value of the contact angles measured. The wettability relative to the surface of the polarizing film of the coating liquid for forming the hard coat layer was "X". By contrast, the wettability relative to the surface of the polarizing film of the waterborne polyurethane resin composition employed in Examples 1 and 2, and the wettability of the coating liquid for forming the hard coat layer relative to the surface of the primer layer formed by the same method as in Example 1, was "○" in all cases. Based on these results, the waterborne resin layer was determined to be highly compatible with both dichroic dye-containing polarizing films and acrylic functional films.

Average contact angle of 85° or less: ○
Average contact angle exceeding 85° but not exceeding 90°: Δ
Average contact angle exceeding 90°: X (Evaluation Scale)
○: No clouding (haze value≤1.0 percent)
X: Clouding present (haze value>1.0 percent)

(2) Evaluation of Adhesion

The adhesion of the lenses evaluated for transparency in (1) above was evaluated by the adhesion evaluation method set forth above.

(3) Adhesion and Transparency after the Warm Water Resistance Test

The transparency (haze value) and adhesion of the polarizing lens after having been immersed for 24 hours in 50° C. warm water and then air dried were evaluated by the methods set forth above for the various polarizing lenses of Examples 1, 2, 4, and 5.

(4) Adhesion and Transparency after the Humidity Resistance Test

The transparency (haze value) and adhesion of the polarizing lens after having been stored in an environment of a humidity of 90 percent RH at a temperature of 40° C. for 168 hours were evaluated by the methods set forth above for the various polarizing lenses of Examples 1, 2, 4, and 5.

The results of the above are given in Table 3.

TABLE 3

| | Thickness of primer layer | Immediately after fabrication | | Adhesion after warm water resistance test | | Adhesion after humidity resistance test | |
|---|---|---|---|---|---|---|---|
| | | Adhesion | Presence or absence of clouding | Adhesion | Presence or absence of clouding | Adhesion | Presence or absence of clouding |
| Ex. 1 | 0.30 μm | ○ | ○ | ○ | ○ | ○ | ○ |
| Ex. 2 | 0.44 μm | ○ | ○ | ○ | ○ | ○ | ○ |
| Ex. 4 | 0.58 μm | ○ | ○ | x | ○ | ○ | x |
| Ex. 5 | 1.24 μm | ○ | x | x | x | ○ | x |

3. Determination of Effect of Film Thickness of Waterborne Resin Layer

Example 4

With the exception that the quantity of waterborne polyurethane resin composition employed was varied to form a primer layer (waterborne resin layer) 0.58 μm in thickness, polarizing lenses were obtained by the same method as in Example 1.

Example 5

With the exception that the quantity of waterborne polyurethane resin composition employed was varied to form a primer layer (waterborne resin layer) 1.24 μm in thickness, polarizing lenses were obtained by the same method as in Example 1.

Evaluation Methods (1) Evaluation of Transparency (Haze Value)

The haze values of the various polarizing lenses of Examples 1, 2, 4, and 5 immediately following fabrication were measured with a Hazemeter HM-150 made by Murakami Color Research Laboratory. The presence or absence of clouding (haze) was evaluated according to the following scale:

As shown in Table 3, the polarizing lenses of Examples 1 and 2, in which primer layers in the form of a waterborne polyurethane resin layers equal to or less than 0.5 μm in thickness were formed, exhibited good transparency and good adhesion between the hard coat layer and polarizing film immediately after fabrication, after the warm water resistance test, and after the humidity resistance test. By contrast, Examples 4 and 5, in which the thickness of the waterborne polyurethane resin layer exceeded 0.5 μm, exhibited poorer adhesion and/or transparency than Examples 1 and 2, as shown in Table 3.

Accordingly, observation by a scanning electron microscope (SEM) (applied voltage: 10 kV; magnification: 5,000×) of the cross-sections of the polarizing lenses of Examples 4 and 5, in which haze had been observed, revealed the generation of cracks in portions beside the primer layers of the polarizing films. Thus, polarizing lenses having a waterborne polyurethane resin layer of a thickness exceeding 0.50 μm as a primer layer were confirmed to exhibit diminished transparency (the generation of haze) due to cracking of the polarizing film. Further, the decreased adhesion of Examples 4 and 5 was also attributed to cracking of the polarizing film.

These results indicated that the formation of a waterborne polyurethane resin layer equal to or less than 0.50 μm in thickness as a primer layer between the polarizing film and a functional layer made it possible to obtain a polarizing lens that was free of haze, highly durable, and of extremely high quality.

The present invention is useful in the field of manufacturing polarizing lenses such as eyeglass lenses.

What is claimed is:

1. A method of manufacturing a polarizing member comprising:
    forming a polarizing film by coating a dichroic dye-containing solution on a substrate;
    subjecting the polarizing film that has been formed to a treatment to immobilize the dichroic dye in the film;
    coating a waterborne resin composition containing a resin component and a water-based solvent on the polarizing film after the immobilization treatment, and drying the composition to form a primer layer; and
    forming a functional film on the primer layer that has been formed;
    wherein after the immobilization treatment but before the coating with the waterborne resin composition, an article to be coated is subjected to heat treatment at a temperature range of 40° C. to 80° C.; and
    wherein the primer layer that has been formed has a thickness equal to or less than 0.5 μm.

2. The method of manufacturing a polarizing member according to claim 1, wherein the immobilization treatment is conducted by coating a silane coupling agent solution on the polarizing film.

3. The method of manufacturing a polarizing member according to claim 1, wherein once the article to be coated has cooled following the heat treatment, the waterborne resin composition is coated.

4. The method of manufacturing a polarizing member according to claim 1, further comprising treating the dichroic dye in the polarizing film to render the dichroic dye insoluble in water.

* * * * *